United States Patent [19]

Boskovic

[11] Patent Number: 4,515,342
[45] Date of Patent: May 7, 1985

[54] SLIDE RETAINER

[76] Inventor: Borislav Boskovic, 2102 Bannockburn, Inverness, Ill. 60067

[21] Appl. No.: 597,719

[22] Filed: Apr. 6, 1984

[51] Int. Cl.³ .................... B29C 1/00; B29F 1/022
[52] U.S. Cl. ................................. 249/122; 425/577
[58] Field of Search ................ 249/68, 122, 151; 425/542, 595, 577, 438, 431, DIG. 5, ; 292/80, 87

[56] References Cited

U.S. PATENT DOCUMENTS

| | | | |
|---|---|---|---|
| 1,059,764 | 4/1913 | Ringer | 292/80 |
| 1,068,965 | 7/1913 | Boehmler | 292/80 |
| 2,336,363 | 12/1943 | Mann | 292/80 |
| 2,994,921 | 8/1961 | Hultgren | 425/DIG. 5 |
| 3,283,373 | 11/1966 | Kiefer et al. | 425/DIG. 5 |
| 3,694,124 | 9/1972 | Saumsiegle et al. | 425/DIG. 5 |
| 3,737,271 | 6/1973 | Novak | 425/DIG. 5 |
| 3,811,645 | 5/1974 | Feist | 425/DIG. 5 |

FOREIGN PATENT DOCUMENTS

| | | | |
|---|---|---|---|
| 22395 | 1/1948 | Finland | 292/80 |
| 43122 | 10/1926 | Norway | 292/80 |

Primary Examiner—Willard E. Hoag
Attorney, Agent, or Firm—Lee, Smith & Zickert

[57] ABSTRACT

A retainer for the laterally moveable slide of a mold for plastic parts. The retainer is positioned to hold the slide in a laterally offset position when the mold is open so that the mold can easily be reclosed without further adjustment of the mold parts. The retainer has a resilient, metal arm, a retention element at one end and a fastener passing through the other end to attach the retainer to a stationary part of the mold. The retention element engages the slide to hold the slide in place when the mold is opened.

17 Claims, 10 Drawing Figures

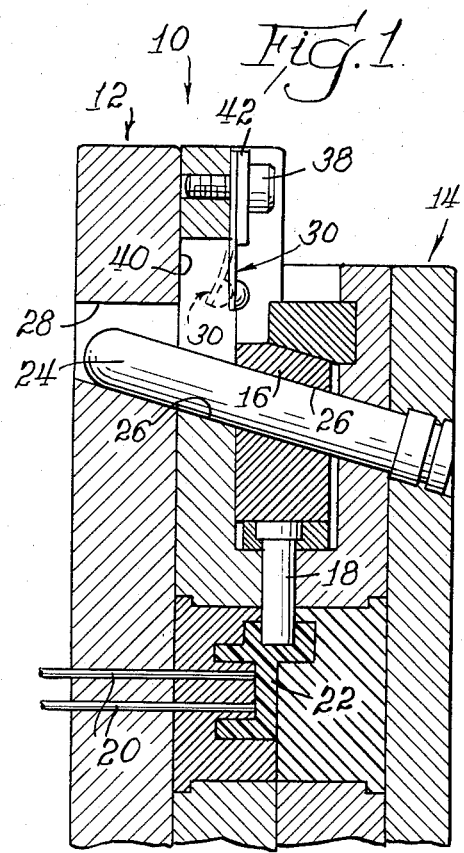
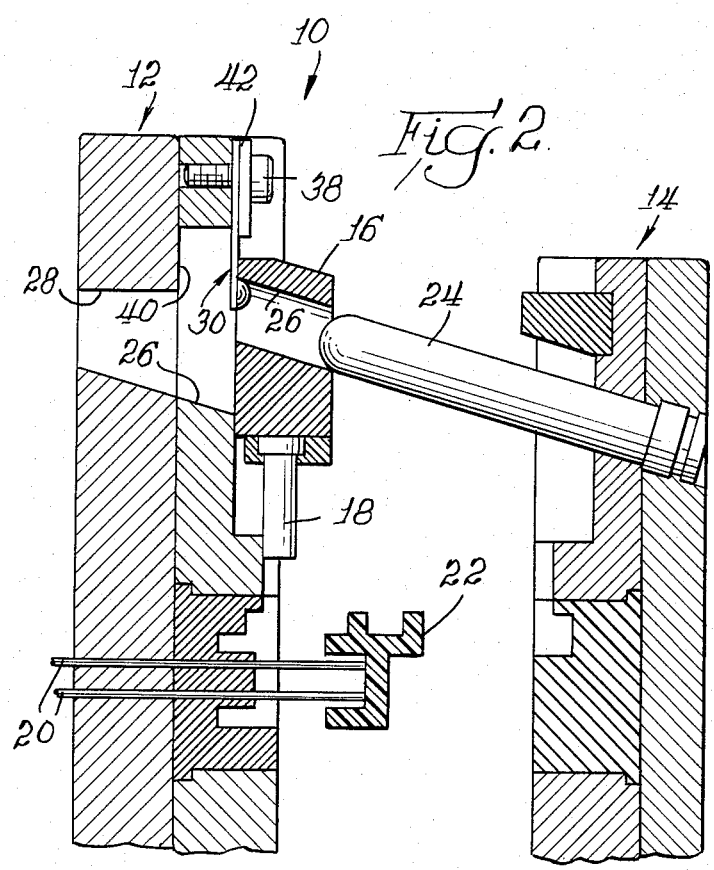
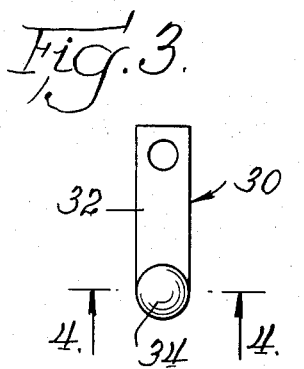
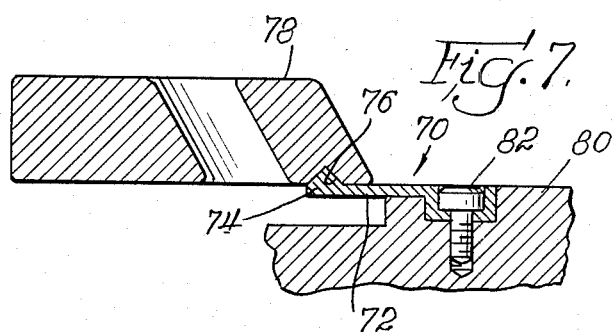
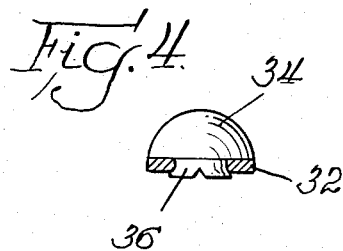
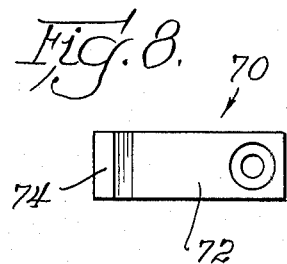

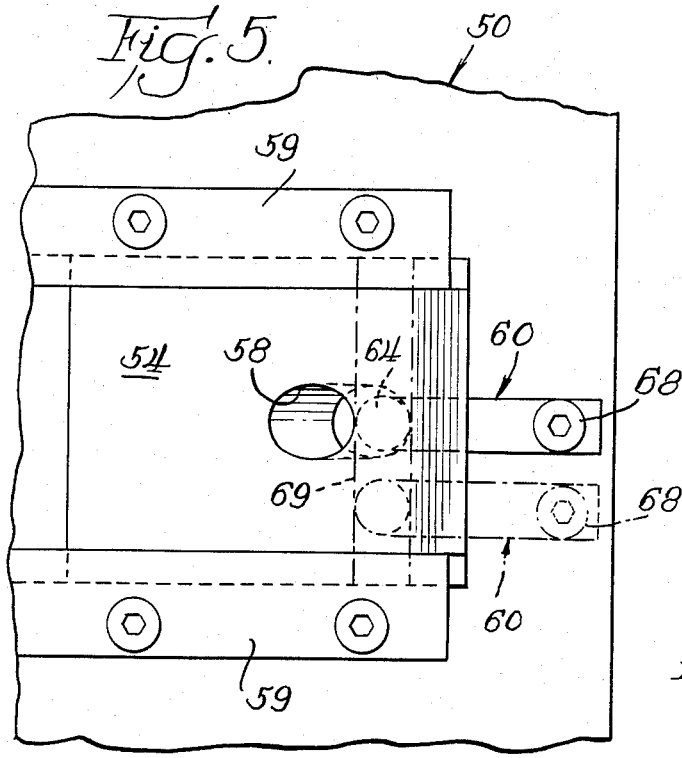
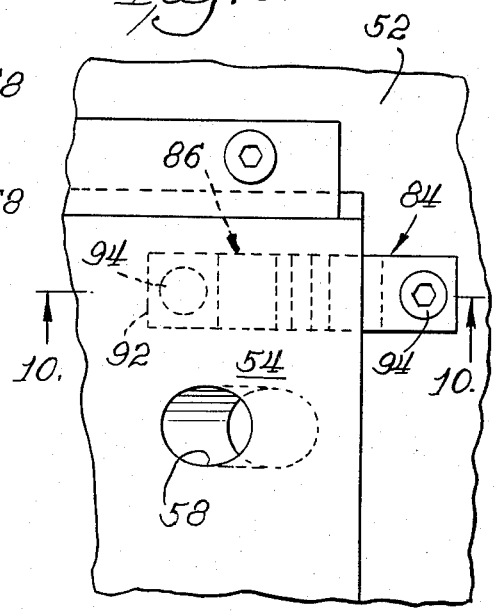
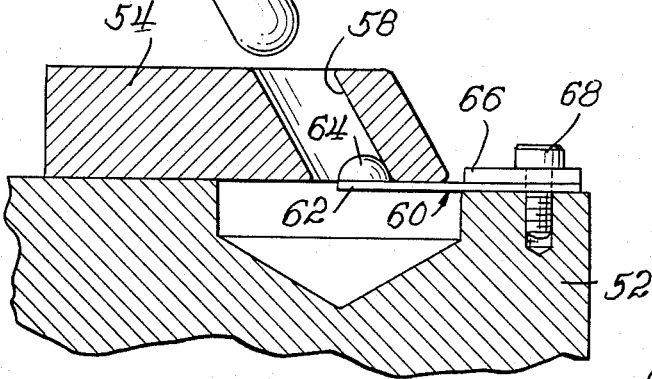
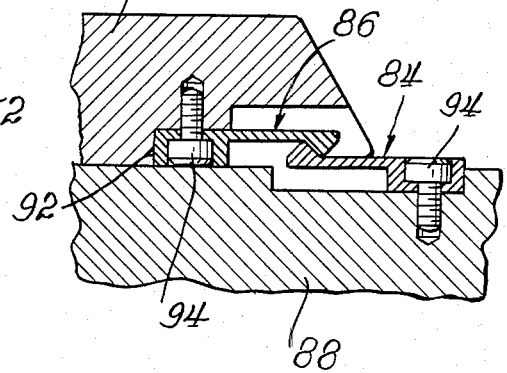

SLIDE RETAINER

BACKGROUND OF THE INVENTION

This invention relates to molds for injection forming of plastic parts, and in particular to a retainer for engaging a mold slide in a laterally offset position during opening of the mold and holding the slide until the mold is again reclosed.

In conventional molds for injection molding of plastic parts, in addition to the typical mating mold parts, one or more laterally moving slides is used to move one or more core parts as the mold is opened and closed. When such a slide is employed, typically the mold uses angled cam pins, known as angle pins, which are fixed to one of the mold parts and which pass through a corresponding bore in the slide. As the mold is opened, the angle of the angle pin "cams" the slide laterally outwardly to remove the core element from the molded piece. When the mold is closed, the procedure reverses, and the angle pin moves the slide toward the mold cavity to position the core element for molding of the next plastic piece.

In the operation of such molds, it is important that the slide be held in place when the mold is opened since, quite often, the mold parts are separated sufficiently so that the angle pin is completely withdrawn from its corresponding bore in the slide. Particularly in the case of molds having vertically-disposed slides, if the slide is not held by some other means, after the mold parts are fully separated, the slide can inadvertently become displaced, inhibiting closing of the mold without manual realignment of the slide. If such misalignment of the slide is not noticed, the mold itself can be damaged should an attempt be made to close the mold.

There has been various efforts to produce slide retainers to avoid alignment problems. For example, U.S. Pat. No. 3,811,645 discloses two types of retainers, a complex prior art retainer which is attached to the mold and juts outwardly from the mold body, and an internal slide retainer having a pin attached to either a mold part or the slide, and a corresponding pin retainer attached to the other of the mold part or the slide. When the mold is opened, the slide is displaced laterally and the pin engages the retainer to hold the slide in place until the mold is reclosed.

Although the retainers disclosed in U.S. Pat. No. 3,811,645 do, in fact, retain the slide in its laterally offset orientation, because of the parts involved, the retainers are complex, subject to failure, and costly in manufacture. Furthermore, for the internal slide disclosed in U.S. Pat. No. 3,811,645, the size of the retainer requires considerable modification of the mold to accommodate the retainer.

SUMMARY OF THE INVENTION

The invention is configured to be used in a mold which has a normally stationary mold part and a mating mold part which is moved against and apart from the stationary mold part during respective closing and opening of the mold. The mold includes a slide attached to a core element for moving the core element laterally inwardly and outwardly during closing and opening of the mold. The invention comprises a retainer means for the slide to position the slide in a laterally offset position when the slide is opened. The retainer means has an elongated, resilient arm, a retention element at one end of the arm, and means for securing the arm to the stationary mold part with the retention element proximate the slide and in the path of the slide as the slide moves outwardly during opening of the mold. Means is provided in the slide for engaging the slide retention element to hold the slide laterally outwardly when the mold is opened.

In one embodiment of the invention, the retention element is semi-spherical in shape and engages a bore or a groove in the slide. In another embodiment of the invention, the retention element engages a detent in the slide which corresponds to the shape of the retention element. In this embodiment, the retention element is generally of a trigonal shape. In another embodiment of the invention, a pair of retainer means are employed, one positioned inversely to and in alignment with the other retainer means such that the retention elements of the retainer means unite when the mold is opened. As in the second embodiment of the invention, the retention elements are generally of trigonal shape.

The arm is secured to the stationay mold part with a fastener which extends through the arm. A stop for the slide may be included, the stop comprising a plate which fastened to the arm in the path of the slide by the fastener.

BRIEF DESCRIPTION OF THE DRAWINGS

The invention is described in greater detail in the following description of examples embodying the best mode of the invention, taken in conjunction with the drawings, in which:

FIG. 1 is a cross-sectional view of a mold employing the retainer of the invention, and showing the retainer in phantom when displaced by the mold slide as the mold is opened;

FIG. 2 is a cross-sectional view similar to FIG. 1, when the mold is opened;

FIG. 3 is a top plan view of one embodiment of the retainer shown in FIGS. 1 and 2, FIG. 4 is an enlarged, partial cross-sectional view taken along lines 4—4 of FIG. 3, FIG. 5 is a fragmentary plan view of a portion of a second type of mold employing the retainer shown in FIGS. 1 through 4, FIG. 6 is a cross-sectional view of the mold of FIG. 5, illustrating the mold angle pin fully withdrawn from the mold slide, FIG. 7 is a cross-section view, similar to FIG. 6, illustrating a second embodiment of the retainer according to the invention, FIG. 8 is a top plan view of the retainer illustrated in FIG. 7, FIG. 9 is a fragmentary plan view of a third embodiment of a mold retainer according to the invention, and FIG. 10 is a cross-sectional view taken along lines 10—10 of FIG. 9.

DESCRIPTION OF EXAMPLES EMBODYING BEST MOLD OF THE INVENTION

The various embodiments of the invention are shown in conjunction with a suitable mold which, as is also conventional, is installed within a suitable injection molding machine. Since the mold and the injection molding machine are conventional and form no part of the invention described below except in cooperation with operation of the invention, the mold and the injection molding machine are not described in detail. Further description of such apparatus is contained in above-identified U.S. Pat. No. 3,811,645.

A conventional mold of the type for which the present invention is intended is shown generally at 10 in FIGS. 1 and 2. The mold consists of a stationary mold part 12, a movable mold part 14 which mates with the mold part 12 and which, as shown in FIG. 2, is moved apart from the mold part 12 when the mold 10 is opened, and a slide 16 which is displaced laterally outwardly and inwardly during opening and closing of the mold 10. The slide 16 carries a core element 18 which enters the mold cavity formed when the mold parts 12 and 14 are closed, as shown in FIG. 1. Push rods 20 are employed in a conventional fashion to remove a molded part 22 when the mold 10 is opened, as shown schematically in FIG. 2.

The mold 10 illustrated in FIG. 1 may be a single-cavity mold (that is, one having the ability to produce one molded part 22 at a time), or may be a multicavity mold, as desired. Whatever the mold size, the movable mold part 14 carries an inclined cam or angle pin 24 which slideably engages a corresponding inclined bore 26 in the slide 16. A further bore 28 is formed in the stationary mold part 12 to accommodate the tip of the angle pin 24 when the mold 10 is fully closed.

The slide 16 is carried between a pair of gibs (illustrated below in connection with the description of FIG. 5), but is otherwise free to be displaced laterally as the mold 10 is opened. As the mold 10 is opened to the extent shown in FIG. 2, and beyond, the angle pin 24 leaves the inclined bore 26. Unless the slide 16 is held in place, the slide 16 would, due to gravity, tend to return to the position shown in FIG. 1. To prevent inadvertent return, a retainer 30 according to the invention holds the slide 16 at its furthest laterally outward excursion during opening of the mold 10. The retainer 30 engages the inclined bore 26, as shown.

The retainer 30 comprises an elongated, flat arm 32, preferably of spring steel or other resilient material, and a retention element 34 in the shape of semi-spherical ball attached to the arm 32 by a rivet 36. Alternatively, the retention element 34 can be adhesively secured to the arm 32, or may be formed as an integral tip at the end of the arm 32.

The retainer 30 is attached to the stationary mold part 12 by means of a threaded fastener 38 which engages a complementary bore in the mold part 12. The retainer 30 is positioned in the path of the slide 16 so that, as shown in phantom in FIG. 1, as mold 10 is opened and the slide 16 is shifted laterally, the retainer 30 is displaced into a cut-out 40 in the stationary mold part 12 to permit passage of the slide 16. At the furthest excursion of the slide 16, the retention element 34 seats within the inclined bore 26 to retain the slide 16 at that location. When the mold 10 is closed, the reverse occurs, and the retainer 30 is again displaced into the cut-out 40 as the slide 16 passes by.

To insure that the slide 16 is not inadvertently shifted so that the inclined bore 26 is out alignment with the angle pin 28, a stop plate 42 is provided, also attached to the stationary mold part 12 by the fastener 38. The stop plate 42 is sufficiently thick so that the slide 16 will, if displaced to the stop plate 42, butt against the stop plate 42 to prevent any further excursion of the slide 16.

The invention is shown employed with a slightly different mold configuration, illustrated generally at 50, in FIGS. 5 and 6. The mold 50 includes the same basic parts as those of the mold 10, but for the ease of illustration, some parts have been omitted. As shown, the mold 50 includes a stationary mold part 52 and a slide 54 which is positioned to be shifted laterally by an angle pin 56 secured to a movable mold part (not illustrated) and which engages a correspondingly-inclined bore 58 in the slide 54. The slide 54 is captured between a pair of gibs 59 which guide the slide during its lateral excursion.

A retainer 60 is used to hold the slide 54 in its laterally outward position, best shown in FIG. 6. The retainer 60 is identical to the retainer 30, and includes a flat arm 62, and a semi-spherical retention element 64. A stop plate 66 is located to prevent over-displacement of the slide 54, and a threaded fastener 68 secures both the stop plate 66 and the retainer 60 to the stationary mold part 52. To hold the slide 54, the retainer 60 may engage either the bore 58 or, if the retainer 60 is offset (as shown in phantom in FIG. 5), the retainer may engage a corresponding lateral groove 69 formed in the slide 54.

A second embodiment of a retainer 70 according to the invention is shown in FIGS. 7 and 8. Similar to the retainers 30 and 60, the retainer 70 has an elongated arm 72 formed of a resilient material, such as spring steel, and a retention element 74 appropriately attached at one end of the arm 72. In this embodiment of the invention, the retention element 74 is of a trigonal shape and engages a similarly-shape detent 76 formed in the slide 78.

Because the detent 76 is employed, the stop plates 42 and 66 of the earlier embodiments of the invention are not required, although they may be employed for an additional margin of safety. The retainer 70 is secured to a stationary mold part 80 by a fastener 82, and, as shown, the stationary mold part 80 is formed so that the retainer 70 is installed generally flush with the upper surface of the mold part 80 so that the retention element 74 is in the path of the slide 78 as the slide moves outwardly during opening of the mold.

The third and final embodiment of the invention is shown in FIGS. 9 and 10. In this embodiment of the invention, a pair of retainers 84 and 86 are positioned to unite when the mold is opened. The retainer 84 is identical to the retainer 70 and is secured to a stationary mold part 88. The retainer 86 is secured to and travels with the laterally displaceable slide 90, and is positioned inversely to the retainer 84. The retainer 86 may also be identical to the retainer 70, or, as shown, may be formed with a fastener well 92 oppositely situated from that of the retainer 84 for geometry considerations. Each of the retainers 84 and 86 is attached to its respective mold part 52 or slide 54 by means of a fastener 94.

In all embodiments of the invention, the retainers 30, 60, 70 or 84 and 86 securely hold a mold slide in a retracted orientation, whether the mold is positioned with the slide vertical, horizontal, or any inclination in between. While the invention is preferably employed in connection with molds having a slide displaced by an angle pin so that the invention can engage the bore in the slide used by the angle pin, it is evident that, as illustrated in the examples of FIGS. 5 through 10, the retainer of the invention can use other means to engage the slide to hold the slide in a retracted orientation. Various changes can be made to the invention without departing from the spirit thereof or scope of the following claims.

What is claimed is:

1. In a mold having a normally stationary mold part and a mating mold part which is moved against and apart from the stationary mold part respectively during closing and opening of the mold, and having a slide attached to a core element for moving the core element laterally inwardly and outwardly during closing and opening of the mold, the improvement comprising a. retainer means for said slide to position said slide in a laterally offset position when the mold is opened, said retainer means comprising
   i. an elongated, resilient arm,
   ii. a retention element at one end of said arm, and
   iii. means securing said arm to said stationary mold part with said retention element proximate said slide and in the path of said slide as said slide moves outwardly during opening of the mold, and
b. means in said slide engaging said slide retention element to hold said slide laterally outwardly when the mold is opened.

2. A mold according to claim 1 in which said retention element is semi-spherical in shape and in which said engaging means comprises a hole in said slide.

3. A mold according to claim 1 in which said engaging means comprises a detent in said slide corresponding to the shape of said retention element.

4. A mold according to claim 3 in which said retention element is generally of trigonal shape.

5. A mold according to claim 1 in which said engaging means comprises a second retainer means secured to said slide inversely to and in alignment with the first retainer means such that the retention elements of said retainer means unite when the mold is opened.

6. A mold according to claim 5 in which said retention elements are generally trigonal.

7. A mold according to claim 1 in which said securing means comprises a fastener extending through said arm into said stationary mold part.

8. A mold according to claim 1 including a stop for said slide.

9. A mold according to claim 8 in which said stop comprises a plate which is fastened to said arm in the path of said slide.

10. A mold according to claim 9 in which said stop is fastened to said arm by said securing means.

11. A mold according to claim 1 in which the movement of said slide is cam-actuated during opening and closing of the mold, the cam-actuated movement being effected by an inclined angle pin on one mold part slidably engaging a correspondingly-inclined bore in the slide, and in which said bore comprises said engaging means.

12. A retainer for a slide of a mold having two mating mold parts and a slide for moving a core element laterally inwardly and outwardly during closing and opening of the mold, the retainer being positioned to hold the slide in a laterally offset position when the mold is opened and comprising, a. an elongated, resilient arm,
b. a retention element at one end of said arm,
c. an aperture through the other end of said arm, and
d. means passing through said aperture securing said arm to one of said mold parts.

13. A retainer according to claim 12 in which said means to secure comprises a threaded fastener.

14. A retainer according to claim 12 including a slide stop plate secured to said arm at said other end.

15. A retainer according to claim 12 in which said arm is generally flat and is composed of spring steel.

16. A retainer according to claim 12 in which said retention element is semi-spherical in shape.

17. A retainer according to claim 12 in which said retention element is of trigonal shape.

* * * * *